United States Patent [19]

Mraz

[11] Patent Number: 5,094,084
[45] Date of Patent: Mar. 10, 1992

[54] CRYOSTAT WITH PRESSURE-RELIEF COVER

[75] Inventor: Beat Mraz, Hombrechtikon, Switzerland

[73] Assignee: Spectrospin AG, Switzerland

[21] Appl. No.: 521,606

[22] Filed: May 10, 1990

[30] Foreign Application Priority Data

May 13, 1989 [DE] Fed. Rep. of Germany ....... 3915788

[51] Int. Cl.⁵ .................. F17C 7/02; G01F 11/10; B65D 25/00
[52] U.S. Cl. .................. 62/51.1; 62/45.1; 220/89.1; 220/208; 220/366
[58] Field of Search .......... 62/45.1, 51.1; 220/203, 220/208, 240, 89.1, 366; 251/75

[56] References Cited

U.S. PATENT DOCUMENTS

| 1,645,722 | 10/1927 | Raymond | 220/203 |
| 2,070,661 | 2/1937 | Hughes | 251/75 |
| 3,107,498 | 10/1963 | Messer | 62/45.1 |
| 3,274,788 | 9/1966 | Hoffman et al. | 62/45.1 |
| 3,948,409 | 4/1976 | Ovchinnikov et al. | 62/51.1 |
| 4,109,819 | 8/1978 | Kushman et al. | 220/208 |
| 4,217,930 | 8/1980 | Lerner et al. | 220/366 |
| 4,516,404 | 5/1985 | Laskaris | 62/45 |
| 4,516,599 | 5/1985 | Nakaya et al. | 137/375 |
| 4,878,352 | 11/1989 | Weber et al. | 62/51.1 |
| 4,909,276 | 3/1990 | Bayly et al. | 220/208 |

FOREIGN PATENT DOCUMENTS 0492626 5/1953 Canada .................. 251/75
844648 10/1958 United Kingdom .
1275388 4/1971 United Kingdom .

OTHER PUBLICATIONS

Cryolab Technical Data Bull No. A017A (rev. 7/85).

Primary Examiner—Albert J. Makay
Assistant Examiner—William C. Doerrler
Attorney, Agent, or Firm—Walter A. Hackler

[57] ABSTRACT

The invention relates to a cryostat, in particular a helium cryostat with an additional nitrogen tank and a vacuum section, comprising a pressure-relief cover arranged at the outside of the tank wall of the cryostat for closing an opening therein. A locking device by which the said pressure-relief cover is retained in position on the tank wall of the cryostat and which, in its closed position, urges the pressure-relief cover against the edge of the tank opening, under the action of a spring, in such a way that the pressure-relief cover is permitted to be lifted off slightly in the presence of a slight overpressure, against the action of a spring, while in the presence of an important overpressure the locking device assumes its open position in which the pressure-relief cover is released from the tank opening, urges the pressure-relief cover automatically against the tank wall so as to close the opening of the tank edge again after a slight overpressure has been released, but releases the opening when an important overpressure prevails in the cryostat. This arrangement prevents damages to the cryostat and avoids the risks connected therewith.

16 Claims, 3 Drawing Sheets

CRYOSTAT WITH PRESSURE-RELIEF COVER

BACKGROUND OF THE INVENTION

The present invention relates to a cryostat, in particular a helium cryostat with an additional nitrogen tank and a vacuum section, comprising a pressure-relief cover arranged at the outside of the tank wall of the cryostat for closing an opening therein.

Cryostats of this type are employed, for example, for housing the superconductive magnet coil of an NMR spectrometer. As is generally known, the cryotank containing the cryogen fluid of a cryostat is enclosed by a vacuum jacket. The vacuum chamber is evacuated for thermal insulation of the cryotank, and the cryotank is additionally enclosed by a superinsulating film. For evacuation of the vacuum chamber, the latter is provided with a vacuum valve through which the vacuum chamber communicates with a vacuum pump and which can be closed after evacuation of the chamber. In addition, the vacuum chamber is equipped with a pressure-relief cover protecting the vacuum chamber from inadmissibly high pressures. In the evacuated condition of the vacuum chamber, the pressure-relief cover is urged against the tank opening of the cryostat by the atmospheric pressure, or the environmental pressure so as to close the opening via a sealing ring, normally an O ring. If during operation of the cryostat the cryotank gets untight, cryogen liquid will get into contact with the warm vacuum jacket and vaporize. The rise in volume of the cryogen fluid resulting from its transition from the liquid into the gaseous phase, leads to a pressure rise in the vacuum chamber. At the point where this pressure exceeds the atmospheric or environmental pressure, the pressure-relief cover is lifted off and the gas is permitted to escape through the tank opening of the cryostat into the open air so as to prevent the vacuum tank from bursting and to avoid the risks resulting therefrom. If, however, a small cross-section is released only when the cover is lifted off, there is a risk that fragments of the superinsulating film which may have got detached may block the outlet opening and prevent further gas from escaping.

If the pressure-relief cover is held on the tank opening of the cryostat merely by the action of the atmospheric pressure, then there is always the risk that the pressure-relief cover may be lifted off as soon as an overpressure condition occurs in the vacuum chamber, and may be completely detached due to its own weight so that a permanent connection may be created between the vacuum chamber and the surrounding air. This normally occurs when an overpressure builds up in the vacuum chamber during heating-up of the empty cryotank—which is normally effected by flooding the vacuum chamber with dry nitrogen gas. Then cold gas, which previously had frozen in the vacuum section of the cryostat, at the surface of the inner liquid helium tank, may start to melt and to vaporize. However, the resulting development of gas is not as violent as in the case of a leakage in the cryotank. If frozen nitrogen gas starts melting and vaporizing the pressure-relief cover should open only in order to release the excess pressure whereafter the opening of the tank should be closed again to protect the tank from humidity, air, dirt, etc., as any humidity would immediately condense on the cold superinsulating film and would thereby affect the latter's effectiveness.

There have been known arrangements where the cryostat tank is provided with a pressure-relief valve of small cross-section and an additional bursting disk of large cross-section. The pressure-relief valve serves the function to release minor overpressure conditions by opening instantaneously. If, however, a higher overpressure prevails in the tank, which can no longer be released by the pressure-relief valve, then the bursting disk will break thereby creating a relief opening of large cross-section. This safety means is, however, rather complicated as the tank has to be equipped with two devices, and is in addition cost-intensive because the bursting disk, being a non-reversible safety device, has to be replaced every time the device is activated.

The bursting disk may also be designed in such a way that it will be flung off the container in the presence of excessive pressure. In order not to endanger the operating personnel in such an event, bursting disks of this type are normally arranged at the tank bottom. However, this arrangement is connected with the disadvantage that the bursting disk will drop off the tank already in the presence of minor overpressures in the tank. In order to remedy this disadvantage, one normally fixes the disk on the tank, for example by means of a glue or an adhesive tape. Such an adhesive bond has, however, an influence on the point in time at which the disk is to be lifted off in the presence of a given pressure inside the tank, and this condition may give rise to accidents.

SUMMARY OF THE INVENTION

Now, it is the object of the present invention to provide a cryostat ensuring a higher degree of safety.

This object is achieved according to the invention by a locking device by which the pressure-relief cover is retained in position on the tank wall of the cryostat and which, in its closed position, urges the pressure-relief cover against the edge of the tank opening, under the action of a spring, in such a way that the pressure-relief cover is permitted to be lifted off slightly in the presence of a slight overpressure, against the action of a spring, while in the presence of an important overpressure the locking device assumes its open position in which the pressure-relief cover is released from the tank opening.

The cryostat according to the invention is provided with a pressure-relief cover comprising a locking device by means of which it can be fixed to the edge of the tank opening. In the detached condition of the pressure-relief cover, the locking device occupies its open position so that it can be introduced through the clear opening. After introduction of the locking device into the tank opening, i.e. once the tank opening has been closed by the pressure-relief cover, the locking device is urged against the tank opening by the action of the spring, thus keeping the pressure-relief cover in the position in which it closes the tank opening.

Now, when a minor overpressure prevails in the vacuum chamber of the cryostat, the pressure-relief cover will release the opening in the tank wall only by a small amount, being lifted off only slightly from the outer surface of the tank wall, against the action of the spring, thus permitting the existing overpressure to be released. During this process, the locking device of the pressure-relief cover remains in its closed position in which it is urged by the spring against the edge of the tank opening so as to retain the pressure-relief cover in position. If, however, cryogen fluid is vaporized in the vacuum chamber of the cryostat, for example due to leakage of the cryotank, this will lead to a sudden increase of the pressure prevailing inside the vacuum chamber so that slight lifting of the pressure-relief cover from the opening of the tank wall will no longer suffice to attain the required pressure balancing effect. In this case, the pressure-relief cover will be lifted off the opening of the tank wall a sufficient amount to cause the locking device to change over from its closed position to its open position in which the pressure-relief cover can be fully detached from the cryostat. Now, the vaporized cryogen fluid, as well as any parts of the superinsulating film that may have been torn off, can escape to the outside, through the tank opening so released.

According to one embodiment of the invention, the locking device comprises at least one catch engaging the edge of the tank opening for connecting the pressure-relief cover to the tank. The catch retains the pressure-relief cover on the tank opening even in the vented condition of the tank.

According to one preferred embodiment of the invention, the position of the catch of the locking device on the edge of the tank is defined by the fact that the catch comprises two noses engaging behind the edge of the tank opening.

According to a preferred arrangement, the catch is guided in convenient guide means for radial displacement relative to the cover axis so that during transition of the locking device from its open condition to its closed condition, the catch can be moved from its position in which it is spaced from the tank opening in the direction of and into contact with the latter.

Once the locking device has been fitted on the edge of the tank opening, with the catch in contact with the edge of the opening, the pressure-relief cover can be brought into engagement with the tank wall due to the fact that guiding means are provided for sliding displacement of the catch toward the inner face of the cover.

Preferably, the guide means has substantially the shape of a U, the free ends of the two legs of the U being connected with the inner face of the pressure-relief cover and at least one leg being provided on its inner face with a guiding groove extending toward the bottom of the U-shaped guide means and accommodating a rocking lever acting upon the catch. The rocking lever forms the connection between the catch and the U-shaped guide means and, thus, the pressure-relief cover. When the rocking lever pivots about its bearing point located in the guiding groove, this has the effect to displace the pressure-relief cover toward or away from the opening of the tank wall. In addition, this rocking lever acts to transmit to the catch the force of the spring which urges the catch into engagement with the edge of the tank opening.

According to a particularly advantageous embodiment of the invention, the end of the rocking lever seated in the U-shaped guide means is subjected to the force of a spring acting in radial direction, parallel to the bottom of the U, while its other end located outside the guide means is connected to the catch. Preferably, the rocking lever is mounted for rotation inside the groove and for radial displacement along the groove, relative to the cover axis. This provides the advantage that the rocking lever is capable of performing not only a rotary movement but also a linear movement in a plane parallel to the pressure-relief cover.

Easy introduction of the locking device into the tank opening is ensured by the fact that the catch fixed to the rocking lever can be tilted in such a way that its end opposite the pressure-relief cover can be pivoted toward the central axis of the cover. With the catch in this inwardly tilted position, the end of the catch will pass easily through the clear opening in the tank wall when the locking device is introduced into or removed from the tank wall.

After the locking device has been fixed in the opening of the tank wall, the pressure-relief cover can be displaced in the direction of the tank wall thanks to the fact that the catch is guided for longitudinal displacement along the outside of one of the legs of the U-shaped guide means.

Preferably, security against tilting of the catch in the open position of the locking device is ensured by the fact that the side of the catch facing the leg of the U-shaped guide means comprises two areas separated by an edge, one of such areas, i.e. the one adjacent the overpressure tank, extending in parallel to the contact surface of the catch for the edge of the tank opening, while the other one is inclined at an angle α toward the contact surface of the catch.

Preferably, the spring action is ensured by a spiral spring, and the pivot axes extend in parallel to the plane of the pressure-relief cover.

According to a preferred embodiment of the invention, the locking device has a symmetrical design, relative to the center axis of the pressure-relief cover. Consequently, the locking device is equipped with two catches arranged opposite each other.

Advantageously, the locking device is arranged on the inside of the pressure-relief cover s that it is protected inside the tank as long as the pressure-relief cover rests on the tank.

Preferably, the pressure-relief cover is provided on the vacuum section of the cryostat, the vacuum section being arranged, advantageously, between the nitrogen tank and a radiation shield and provided with a superinsulation on the inside.

According to one preferred embodiment of the invention, the pressure-relief cover is arranged on the bottom face of the cryostat. Another convenient aspect lies in the fact that the pressure-relief cover consists of a non-magnetic material, such as aluminium or the like.

Other advantages, features and details of the invention will appear from the following specification describing one particularly preferred embodiment of the invention in more detail, with reference to the drawing.

DESCRIPTION OF THE PREFERRED EMBODIMENTS

Figure 1:
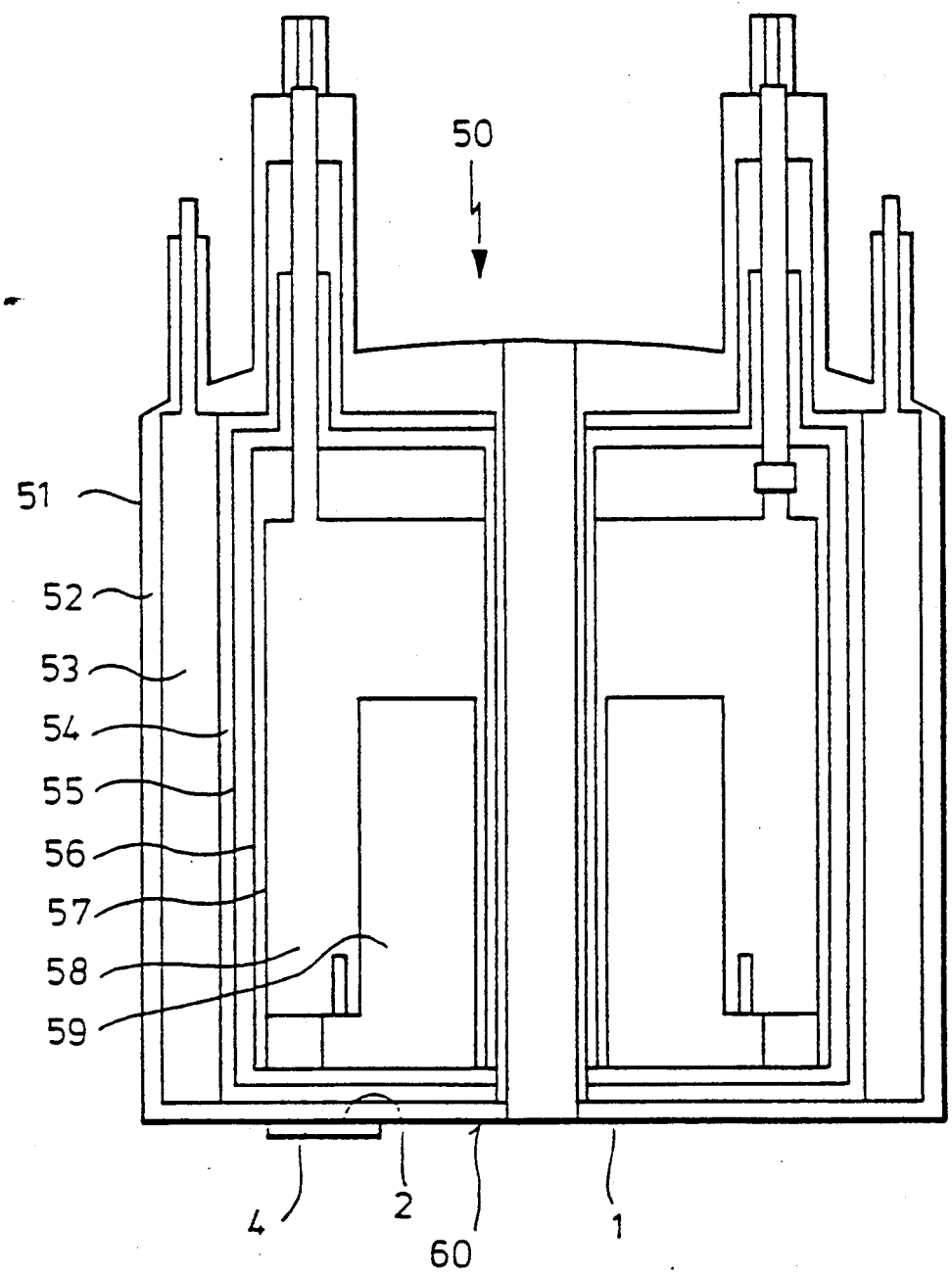
FIG. 1 shows a side view of a cryostat cut along its longitudinal axis.

FIG. 1 shows a cryostat, generally indicated by 50, comprising a jacket 51 constituting the tank and containing, from the outside toward the inside, a vacuum section 52, a nitrogen tank 53, two radiation shields 55 and 56 arranged in another vacuum section 54, a superinsulating film 57, a helium tank 58 and a bobbin 59 accommodated in the helium tank 58. The bottom 60 of the tank wall 1 is provided with an opening 2 which communicates with the vacuum section 52, 54 of the cryostat 50 and which is closed by means of a pressure-relief cover 4.

Figure 2:
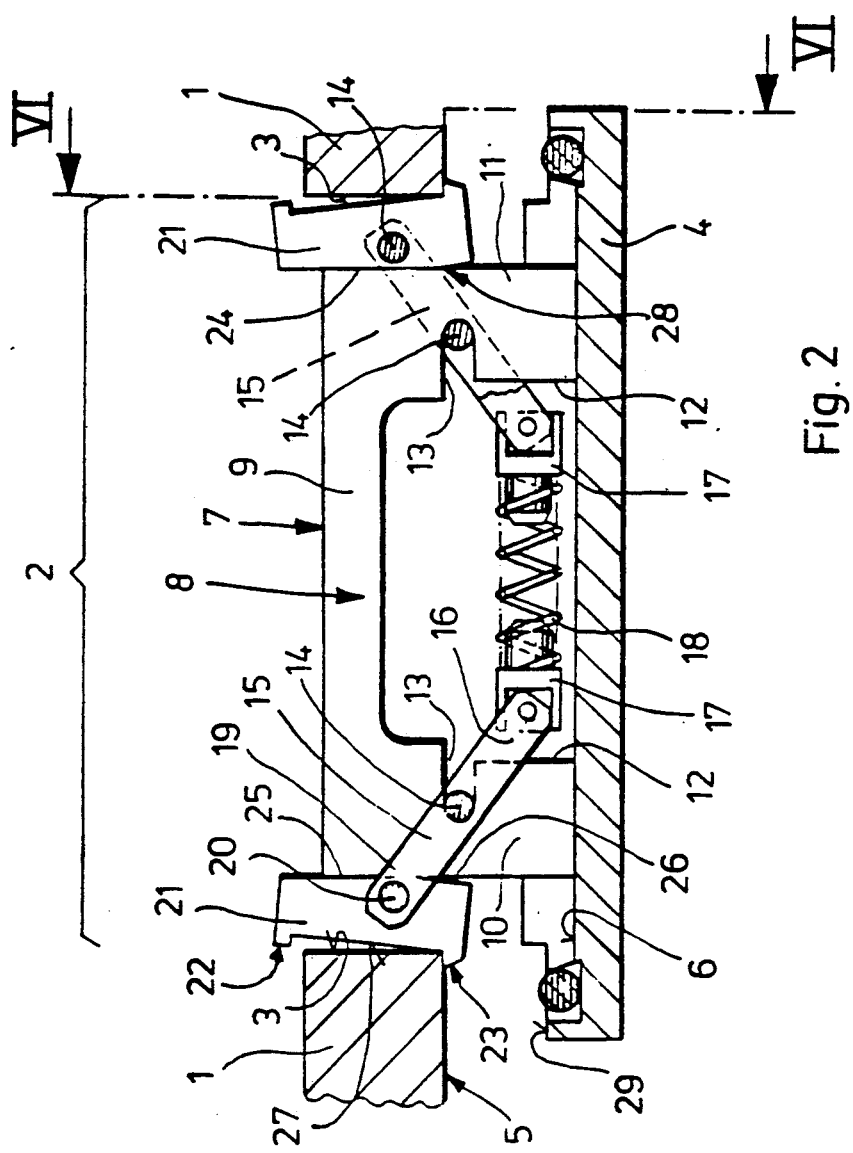
FIG. 2 shows a cross-section through a pressure-relief cover with locking device, with the locking device in the open condition and with tilted catches.

FIG. 2 shows the tank wall 1 of the cryostat 50 illustrated in FIG. 1, with the opening 2 defined therein by the edges 3 of the tank wall 1. The opening 2 forms the connection between the vacuum chamber 52, 54 of the cryostat 50 and the environment in which atmospheric pressure prevails. The opening 2 is closed by the pressure-relief cover 4 which is mounted on the outside 5 of the tank wall 1 across the opening 2. The pressure-relief cover 4 is equipped with a locking device 7 mounted on its inside 6. A rigid connection between the locking device 7 and the pressure-relief cover 6 is achieved, for example, by screws or the like. The locking device 7 comprises U-shaped guiding means 8 consisting of a bottom 9 and two legs 10 and 11 projecting from the bottom 9 in the direction of the pressure-relief cover 4. The inner faces 12 of the legs 10 and 11 are provided with grooves 13 which are worked into the legs 10 and 11 in parallel to the longitudinal axis of the bottom 9. The grooves 13 accommodate transverse pins 14 serving as pivot bearing for rocking levers 15. The transverse pins 14 are arranged for displacement in the longitudinal direction of the grooves 13 and capable of rotating about their axes inside the grooves 13. The ends 16 of the rocking levers 15 inside the U-shaped guide means carry spring-mounting means 17 engaging the two open ends of a coil compression spring 18. The two other ends 19 are connected with catches 21, via transverse pins 20. These transverse pins 20 fix the catches 21 also pivotally on the ends 19 of the rocking levers 15. The sides of the catches 21 opposite the guide means 8 are provided with an upper nose 22 and a lower nose 23, the lower nose 23 engaging the outside 5 of the tank wall 1, in the area of the edge 3 of the opening 2, while the nose 22 is located inside the clearance of the opening 2. The sides 24 of the catches 21, opposite the legs 10 and 11, are subdivided into two areas 25 and 26, the area 26 extending in parallel to the contact surface 27 between the two noses 22 and 23, while the area 25 is inclined at an angle (FIG. 3) toward the contact surface 27. In the position illustrated in FIG. 2, the catches 21 have been pivoted about the transverse pins 20 in such a way that the areas 25 of the sides 24 are in contact with the outer faces of the two legs 10 and 11, whereas the areas 26 and the outsides of the two legs 10 and 11 include between them an angle α. Due to this tilted position, the catches 21 are spaced a certain distance from the edge 3 of the opening 2 of the tank wall 1 so that the noses 22 are located inside the clearance of the opening 2. This tilted position of the catches 21 is stable thanks to the fact that the two spring-mounting means 17 are urged apart by the action of the coil compression spring 18, whereby the rocking levers 15 are caused, by deflection of this force through the transverse pins 14, to press the areas 25 of the two catches 21 against the outer faces of the two legs 10 and 11. In this position of the locking device 7, i.e. the open position, the two catches 21 can be introduced easily into the opening 2 until the noses 23 come into engagement with the outside 5 of the tank wall 1, in the area of its edge 3.

By pressing the pressure-relief cover 4 further in the direction of the opening 2, the two catches 21 are pivoted so as to bring their contact surfaces 27 into contact with the edge 3 of the opening 2. In this position, the two noses 22 and 23 engage the edge 3 from both sides, thus securing the locking device 7 against displacement. The pivoting movement of the catches 21 results from the fact that when additional pressure is applied on the pressure relief cover 4 the noses 23 come to rest against the outside 5 of the tank wall 1 and the catches 21 are caused to tilt about the edge 28 separating the areas 25 and 26 (FIG. 2) so that now the areas 26 extend in parallel to the outsides of the legs 10 and 11. The tilting movement of the catches 21 causes simultaneously the rocking levers 15 to be pivoted slightly about the transverse pins 14 whereby the spring-mounting means 17 arranged at the ends 16 of the rocking levers 15 move towards each other which has the effect to slightly compress the helical spring 18.

When the pressure relief cover 4 is urged further in the direction of the opening 2 of the tank wall 1, this has the effect to pivot the rocking levers 15 an additional way about the transverse pins 14 and to cause such transverse pins 14 simultaneously to perform a translational movement in the grooves 13 of the legs 10 and 11, toward the inside of the U-shaped guide means 8. As the transverse pins 20 forming the pivotal connection between the catches 21 and the rocking levers 15 are now located in one line with the transverse pins 14 and the spring-mounting means 17, and as in addition the coil spring 18 is now in its fully compressed condition, the position assumed at this moment by the locking means 7 is an instable state between the open position illustrated in FIGS. 2 and 3 and a closed position illustrated in FIG. 5, which will be described hereafter in more detail.

Figure 4:
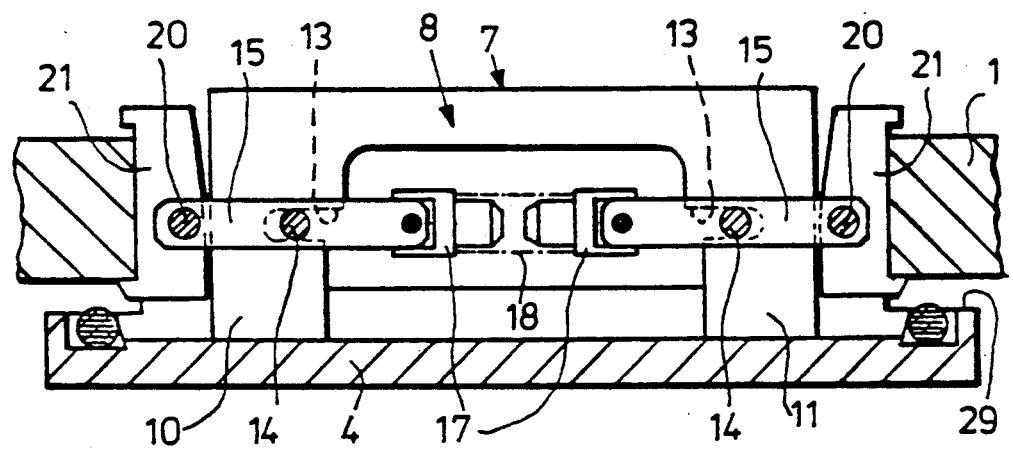
FIG. 4 shows a cross-section through a pressure-relief cover, with the locking device in an instable condition between its open and its closed positions.
Figure 5:
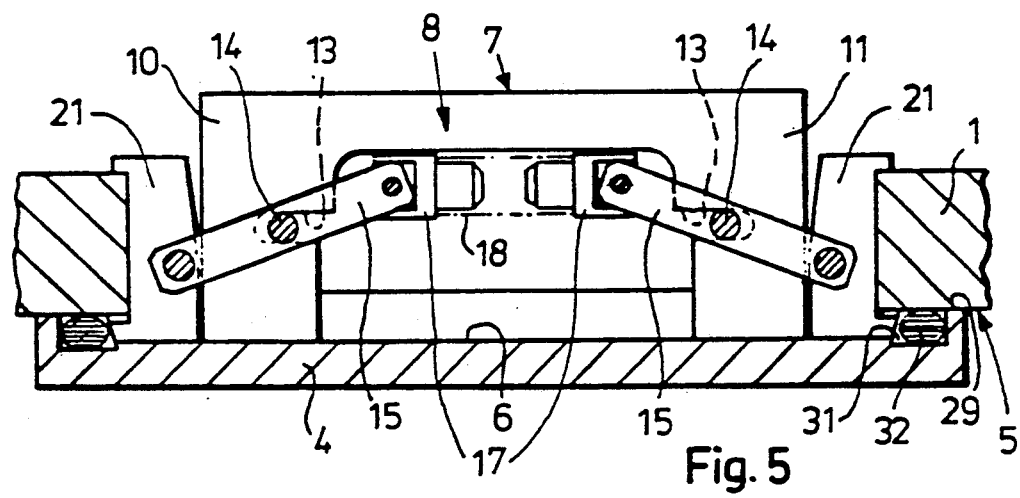
FIG. 5 shows a cross-section through a pressure-relief cover, with the locking device in the closed position.

A slight additional pressure exerted upon the pressure relief cover 4 in the direction of the tank wall 1 causes the locking device 7 to leave its instable position illustrated in FIG. 4 and to assume automatically the closed position illustrated in FIG. 5. This automatic transition into the closed position is effected by the helical spring 18 which urges the two spring-mounting means 17 resiliently outwardly, thereby pivoting the rocking levers 15 about the transverse pins 14. At the same time, the transverse pins 14 perform again a translational movement in the grooves 13, toward the outsides of the legs 10 and 11 of the U-shaped guide means 8. The stable closed position is reached when the inner circumferential edge 29 of the pressure relief cover 4 is in contact with the outside 5 of the tank wall 1. A circumferential groove 31 provided on the inside 6 of the pressure relief cover 4, adjacent the inner circumferential edge 29, accommodates a sealing ring 32, in particular an O-ring which is squeezed together when the inner circumferential edge 29 is urged upon the outside 5 of the tank wall 1, whereby the opening 2 is sealed off from the surrounding air.

Figure 6:
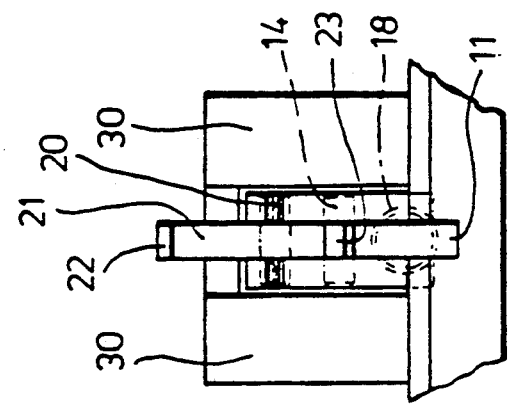
FIG. 6 shows a section through the locking device according to FIG. 2, along line VI—VI.

The operation of the pressure relief cover 4 is as follows:

Regarding FIG. 6, which represents a sectional view taken along line VI—VI, one can see among other things two mounting parts 30 which serve, for example, to mount the locking device 7 on the inside 6. In addition, the mounting parts 30 secure the transverse pins 14 in the grooves 13 from lateral disengagement.

Now, when a slight overpressure builds up in the cryostat 50, the pressure relief cover 4 will be raised a certain amount from the outside 5 of the tank wall 1, thereby pivoting the rocking levers 15 and compressing simultaneously the coil spring 18, so that the overpressure is permitted to escape to the outside, i.e. into the open air. Considering, however, that the coil spring 18 always tends to overcome the overpressure, the pressure relief cover 4 will seal off the opening 2 of the cryostat 50 already before the overpressure has been relieved completely, which means that when the pressure relief cover 4 is closed, there will still exist a slight overpressure which will, however, be lower than at the beginning of the pressure-equalization process. Consequently, the locking device 7 of the pressure relief cover 4 enables the overpressure to be reduced to a given value, which is however in any case above the environmental pressure. This continuous though slight overpressure prevailing in the cryostat 50 prevents, for example, humidity from penetrating into the interior 50 and from condensing on, and reducing the effectiveness of the cold superinsulating film 57. The interior pressure of the cryostat 50 still prevailing after closing of the pressure relief cover 4 can be determined by proper selection of the force of the helical spring 18 and of the weight of the pressure relief cover 4 and the locking device 7.

Figure 3:
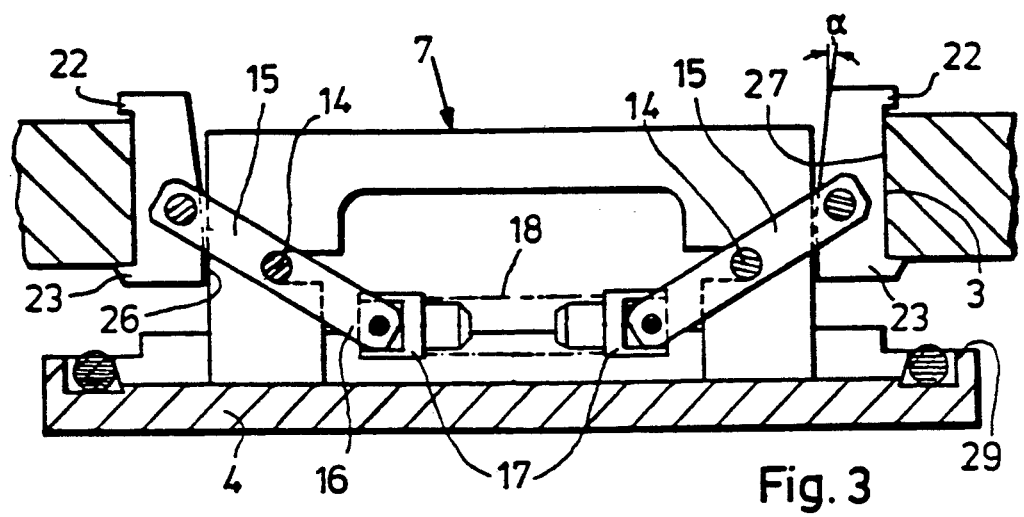
FIG. 3 shows a view similar to that of FIG. 2, with the catches in engagement with the edge of the tank opening.

If, however, instead of changing gradually the interior pressure should rise abruptly, for example due to a leakage in the cryotank, then the pressure relief cover 4 is lifted off the outside 5 of the tank wall 1 a sufficient distance to move the locking device 7 beyond its instable position illustrated in FIG. 4 and into its open position illustrated in FIGS. 2 and 3. In this open position, the catches 21 are then tilted about the edge 28 in such a way that the areas 25 abut against the outsides 24 of the two legs 10 and 11 whereby the two noses 22 of the catches 21 are moved into a position inside the clear opening 2 so that the pressure relief cover, together with the locking device 7, is now in a position to release the opening 2. Once the opening 2 has been released fully, the cryogen fluid vaporizing in the cryostat 50 can escape into the atmosphere, without any risk of destruction of the vacuum tank.

I claim:

1. A pressure-relief cryostat comprising:
   a jacket tank having an opening therein;
   a nitrogen tank disposed within said jacket tank;
   a vacuum section disposed within said jacket tank;
   cover means for sealing the tank wall opening;
   locking means for retaining said cover means in a position covering the opening and for releasing said cover means from the opening when pressure in the cryostat tank against said cover means reaches a selected level, said locking means comprising at least one catch engaging the edge of the tank opening, said catch comprising two noses engaging an area behind the edge of the tank opening; and
   spring means for urging said cover means against an edge of the wall opening in a manner enabling the cover to be temporarily lifted from the opening while retained in a position covering the opening by the locking means at pressures less than said selected level thereby relieving pressure less than said selected level without release of said cover means from the opening.

2. The cryostat according to claim 1, wherein the catch includes guide means for radially displacing the catch relative to a cover means axis and for enabling sliding displacement of the catch toward an an inner face of the cover means.

3. The cryostat according to claim 2, wherein said guide means has substantially the shape of a U having two legs with free ends thereof connected with an inner face of the cover means and at least one of said legs being provided on an inner face thereof with a guiding groove extending toward a bottom of the U-shaped guide means and accommodating a rocking lever action upon the catch.

4. The cryostat pressure-relief cover according to claim 3, wherein an end of the rocking lever is seated in the U-shaped guide means and subjected to the force of a spring acting in a radial direction, parallel to the bottom of the U-shaped guide means and another end of the rocking lever is disposed outside the guide means and connected to the catch.

5. The cryostat pressure-relief cover according to claim 3, wherein the rocking lever is mounted both for rotation inside the groove and for radial displacement along the groove relative to the cover means axis.

6. The cryostat according to claim 4 further comprising means, pivotally mounting said catch to the rocking lever, for enabling an opposite end of the catch to be pivoted toward the cover means axis.

7. The cryostat pressure-relief cover according to claim 3, further comprising means mounting said catch for guided longitudinal displacement along an outside of one of the legs of the U-shaped guide means.

8. The cryostat pressure-relief cover according to claim 3, wherein a side of the catch facing the leg of the said U-shaped guide means comprises two areas separated by an edge, one of said areas extending parallel to an edge contact surface of the catch and another one of said areas inclined at an angle with the contact surface of the catch.

9. The cryostat pressure-relief cover according to claim 6, wherein a pivot axis of the rocking lever extends parallel to the plane of the cover means.

10. The cryostat pressure-relief cover according to claim 2, wherein the locking means has a symmetrical design, relative to a center axis of the cover means.

11. The cryostat pressure-relief cover according to claim 1, wherein the locking means is disposed on an inside of the cover means.

12. The cryostat pressure-relief cover according to claim 1, wherein the cover means is disposed on the vacuum section of the said cryostat.

13. The cryostat according to claim 12, wherein the vacuum section is disposed between the nitrogen tank and a radiation shield.

14. The cryostat according to claim 1, further comprising a superinsulation layer within the vacuum section.

15. The cryostat according to claim 1, wherein the cover means is disposed on a bottom face of the cryostat.

16. The cryostat according to claim 1, wherein the cover means comprises a non-magnetic material.

* * * * *